Patented Aug. 23, 1932

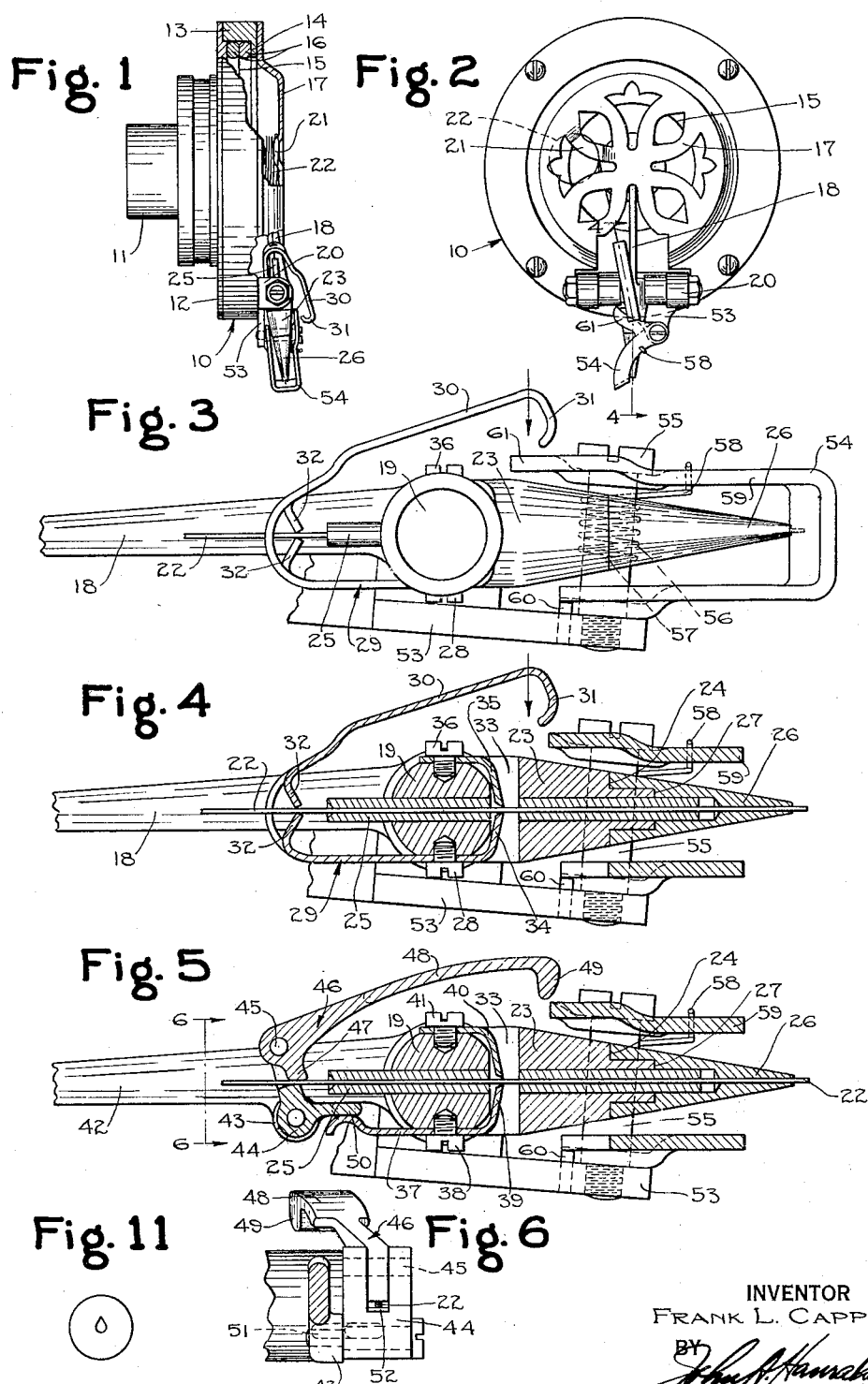

1,872,672

UNITED STATES PATENT OFFICE

FRANK L. CAPPS, OF MILFORD, CONNECTICUT, ASSIGNOR TO COLUMBIA PHONOGRAPH COMPANY, INC., OF BRIDGEPORT, CONNECTICUT, A CORPORATION OF NEW YORK

SOUND REPRODUCER

Application filed March 20, 1928. Serial No. 263,011.

This invention relates to sound reproducing apparatus of the kind known as phonographs or talking machines and has particular reference to improvements in the stylus or needle holding and feeding means forming part of the reproducer or sound box of such machines.

An object of the invention is to provide means whereby a length of hard, wear-resisting wire may be used as a stylus, provision being made for the forward feeding of the wire as the same wears, due to contact with the record surface, during the reproducing operation.

Another object of the invention, is to provide means having the characteristics stated, wherein the feeding means for the wire or adjustable stylus is supported at the axis of the stylus bar, whereby, the weight of the latter, below the axis, is not increased beyond the weight of the usual arrangement employing renewable stylus points, and the sensitiveness of the apparatus will remain unimpaired.

A further object of the invention is to provide a feeding means for renewing the stylus point as the same becomes worn, the feeding means being operated by a simple manipulation of a lever member to feed the stylus forward a predetermined distance.

A still further object of the invention, is to provide a construction whereby the stylus is securely gripped so that it may only move with the stylus bar, without the employment of the usual screws or clamping jaws.

An additional object is to provide a stylus holding, feeding and gaging means having the foregoing characteristics and which involves but a few simple parts, rugged in construction, and unlikely to get out of order, and which will not impair the appearance or efficiency of the sound box or reproducer, or pick-up in connection with which it may be used.

Another object is to provide a gaging means for cooperation with stylus feeding means, to limit the distance the stylus is fed in order that after each operation of the feeding means, the stylus will project but a predetermined distance. A further and more specific object is to provide a gaging means automatically moved into operative position by the feeding means. Yet another object is to provide a stylus feeding and gaging means which is equally adapted for use on an acoustic reproducer or on an electric pick-up.

Other and additional objects will become apparent from consideration of the following detailed description taken in connection with the accompanying drawings, wherein for the purpose of illustration only, there are shown operative embodiments of the invention, it being understood that changes in the construction, combination and arrangements of parts, may be resorted to without departing from the spirit of the invention, or the scope of the appended claims to which reference must be had for a definition of the limitations of the invention.

In said drawings:—

Fig. 1 is a side elevational view showing the application of the invention to a well known reproducer, parts of the reproducer structure being broken away to show more clearly the arrangement of the present invention;

Fig. 2 is a front elevational view of the same;

Fig. 3 is a side elevation greatly enlarged, showing the application of the invention to the stylus bar, the latter being removed from the reproducer;

Fig. 4 is a vertical, longitudinal, sectional view, greatly enlarged, substantially along the line 4—4 of Fig. 2, the sound box being omitted;

Fig. 5 is a sectional view showing a modification of the stylus holding and feeding means, the view being on a greatly enlarged scale;

Fig. 6 is a sectional view on the line 6—6 of Fig. 5 looking in the direction of the arrows;

Fig. 11 is a view showing only the end of the stylus holder to illustrate the shape of the opening through which the stylus passes, the view being greatly enlarged;

Figures 7, 8:
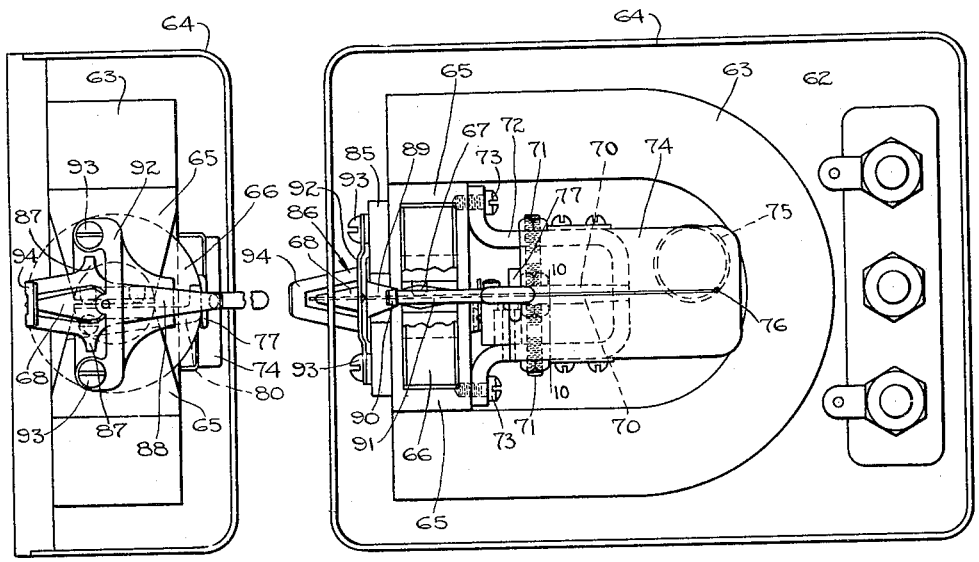
Fig. 7 is a plan view of an electric pick-up equipped with my feeding and gaging means, the cover being removed.
Fig. 8 is an end elevational view.

Referring in detail to the drawings at 10, an acoustic sound box or reproducer of a well known make, is shown in order that the application of the invention may be clearly understood, it being obvious that the invention may be employed with other types or constructions of sound boxes or reproducers. Briefly, the reproducer 10 includes a means 11 for connecting the same with a tone-arm, a back plate 12, a ring 13, carrying a flange 14, between which and the back 12, a diaphragm 15 is clamped by tubes or the like 16. A guard 17 is placed over the front of the sound box to protect the diaphragm, and to give the sound box a finished appearance. The stylus bar 18 has its axis 19 pivotally mounted between lugs 20 carried by the ring 13. It is believed this brief description of the sound box will suffice to make clear enough of its structure, in order that the application of the present invention, will be readily understood.

According to the present invention some means is provided whereby a length of wire is carried by or associated with the reproducer. As one means for accomplishing this, a portion 21 of the guard 17 is depressed inwardly and has disposed against its inner surface a coil of wire 22. One end of the wire is passed over portion 21 and then under the guard as best shown in Fig. 2. The wire is adapted to be fed by a means to be described whereby a renewable stylus is provided. As the free end of the wire is drawn upon the coil is simply uncoiled, the reserve remaining in close contact with the rear of portion 21.

In that form of the invention shown in Figs. 1 through 4, the axis 19 carries a depending portion 23, forming part of the stylus bar and tapered as shown and cut away to form an annular shoulder 24. A tube is passed through the axis 19 and portion 23 to form a passageway for the wire 22. A cone-shaped tip 26, suitably drilled inside to form a shoulder 27, is applied to the portion 23 in such a manner that its larger end abuts the shoulder 24 and its shoulder 27 abuts the free end of the portion 23. Also the tip 26 receives a portion of the tube 25 as clearly shown in Fig. 4. The taper of tip 26 and portion 23 is such that a continuous taper is provided and the assembled parts look much like an ordinary needle or stylus. At its lower end the tip is drilled to provide a circular opening, and the tip is then forced into a die, so that the shape of the opening is changed to the somewhat heart-shaped opening clearly shown in Fig. 11. My reason for this particular shape will later be set forth.

Secured to the rear side of the axis 19, as by screw 28, is a somewhat U shaped member 29. The free end portion 30 of member 29 provides a lever member or finger piece adapted on being properly manipulated to feed the wire through and beyond the tip. Also, the free end of lever 30 is turned downwardly and curved inwardly as shown to provide a cam portion 31 for a purpose to be described. At its bend, this U shaped member 29 is sheared along lines to form a substantially H shaped cut, and the finger pieces between the cuts are pressed downward to form the wire feeding fingers 32 between which the wire 22 passes.

The depending portion 23 at the point where it engages the axis, is cut through after the tube has been inserted, a kerf 33 being so formed that the tube 25 is cut into two sections. It is desirable to form this cut after the tube has been inserted, since by following this procedure, assurance is had that the adjacent ends of the two sections of the tube will be in alignment.

As will be readily seen by an inspection of Fig. 4, a short length of wire is exposed in the kerf 33. One end of the member 29 is extended to provide a gripping finger 34, a second gripping finger 35, on the opposite side of the wire being secured to the axis 19, by suitable means as, for example, a screw 36.

In the operation of device, assuming that the wire 22 has been fed into the tube 25, then by repeatedly pressing lever member 30, the wire will be fed through the tube and tip and projected beyond the latter in position for operation. When the lever member 30 is pressed, the fingers 32 first grip the wire, then continued pressure on the member in the direction indicated by the arrow in Figs. 3 and 4, causes the member 29 to flex and brings about a forward movement of the fingers, resulting in a forward feeding of the wire.

The fingers 34 and 35 prevent backward movement of the wire and as soon as pressure on the lever member 30 is released, the parts move back to their normal position, leaving the wire slightly advanced.

Owing to the shape of the passage through the forward portion of the tip 26, the wire will become wedged in the contracted portion thereof when the stylus is placed in contact with a record. The parts are so arranged that the weight of the sound box on the stylus, and the direction of movement of the record combine to bring about this wedging action.

Referring to that form of the invention shown in Figs. 5 and 6, the structure of the parts is the same, with the exception of the feeding means. In this form of the invention, a spring member 37 is secured to the axis by any suitable means as a screw 38 and has one end portion 39 disposed in the kerf 33 to cooperate with the finger of a member 40, secured as by screw 41, to the axis. The fingers 39 and 40 co-operate to prevent backward movement of the stylus, as in the case of the fingers 34 and 35, in that form of the invention, previously described.

On the rear side of the upper portion 42 of the stylus 18, is a lug 43 on which is pivotally mounted a substantially L shaped member 44. The vertical portion of this member is bifurcaated, as more clearly shown in Fig. 6, and between its arms on a pivot 45, is mounted a second L shaped member 46, including a depending gripping portion 47 and a finger piece 48. A cam 49 is formed on the end of finger piece 48 and corresponds with the cam 31 of the figures previously described.

The other arm 50 of the member 44 is provided with a projection 51 extending laterally to a position beneath the stylus bar. With its free end engaging the underside of the member 50 springs 37 normally maintains the projection 51 in engagement with the stylus bar, the other parts being positioned substantially as shown in Fig. 5. From this, it will be seen that the stylus bar acts as a stop to limit movement of the parts in one direction.

In operating that form of the invention shown in Figs. 5 and 6, assuming the wire to have been fed between the arms of the upstanding bifurcated portion of the member 44, and into the tube 25, it is but necessary to repeatedly depress the finger portion 48, of lever member 46, in order to feed the wire through the tube and tip, and have the wire project slightly beyond the end of the tip, in position for operation. The action which takes place, may be described as follows:—

The first movement of lever 46 is about its pivot 45, resulting in its portion 47 wedging the wire against the anvil 52, formed between the arms of the bifurcated portion of member 44. Further depression of the finger piece 46 results in a turning movement of the member 44 about its pivot and against the action of spring 37, resulting in a forward feed of the wire. As before explained, fingers 39 and 40 prevent backward movement of the wire, and as soon as pressure is released on the finger piece 48, the spring 37 acting on arm 50 returns the parts, with the exception of the wire, to the relative position previously occupied.

Means are provided to limit the extent to which the wire 22 may be fed to project beyond the tip 26. With reference to each of Figs. 1 through 6, this means takes the same form and includes a projecting plate or lug 53 secured to, or formed integrally with the guard 17. A substantially U shaped guard member 54 is journaled on a post 55 which has its lower end reduced and threaded into a tapped opening in the plate 53, as clearly shown in Figs. 3, 4 and 5.

Disposed about the post 55 is a coil spring 56 having one end bent and disposed in an opening 57 in the post, and having its other end 58 extended and bent about one arm 59 of the member 54. The spring acts to move the guard away from the projecting end of the wire 22, and movement of the guard under the influence of the spring, is limited by contact of the guard with a stop pin 60 carried by plate 53.

The forward side of the guard or gage includes an extension 61 adapted to be engaged by the cam surfaces 31 and 49 to swing the guard into a position in the path of the projecting end of the wire 22, so as to limit the extent to which this wire may be fed beyond the smaller end of the tip 26.

In operation, the finger pieces 30 and 48 of the two forms disclosed, have an initial movement which results in a gripping of the stylus wire. It is during this initial movement, that the cam surfaces come in contact with the extension 61, to swing the gage into active position against the action of the spring 56. Final or feeding movement, resulting from further depression of the finger pieces 30 and 48, does not influence the position of the gage, since after the curvature at the ends of the depending portions 31 and 49, these same portions are straight where they engage extension 61. It will be readily understood that when the finger pieces 30 and 48 are releasd, the spring 57 will immediately return the gage to its normal position, i. e. the position shown best in Fig. 2.

In addition to performing its function as a gage, the member 54 also acts as a safety device to prevent destruction of the tip 26, by having the same engaged in the groove of a rotating record. The position of the guard relative to the projecting end of the stylus during playing, is such that should the stylus become substantially entirely worn off, the guard will come into contact with the record, and presenting a relatively broad surface, little if any damage will be done either to the reproducer or record.

Referring to that form of the invention disclosed in Figs. 7. 8, 9 and 10 the feeding and gaging means is here shown as applied to an electric "pick-up." The "pick-up" is for use on an electric phonograph and employs a stylus for engagement in the groove of an ordinary phonograph record rotated in any or the usual manner beneath the stylus.

In the figures mentioned. a pick-up is outlined for the purpose of showing clearly the application of one form of the invention to a known type of pick-up. The parts are shown in twice their normal size and briefly, the pick-up comprises a base 62 on which a horse shoe magnet 63 is mounted, and the whole enclosed within a cover or casing 64. Disposed between the ends of the magnet 63 is a pair of U shaped pole members 65 having their free ends disposed adjacent each other. Mounted in the space thus provided by the pole members is a coil 66, within which is pivotally mounted for movement under the influence of a stylus, an armature 67. Secured to the forward lower portion of the armature 67 is a tapered member 68 corresponding to and constructed in the same manner as the part 23, and tip 26 of those forms of the invention previously described. In this form of the invention, armature 67 and member 68 form a stylus bar. Projecting rearwardly from the armature 67 is a reed or spring 69 rigidly connected with the armature and at its rear end clamped between plates 70, through the use of bolts 71, carried at the sides of a U shaped frame 72, of nonmagnetizable material, connected with the pole members as by means of screws 73.

Figures 9, 10:
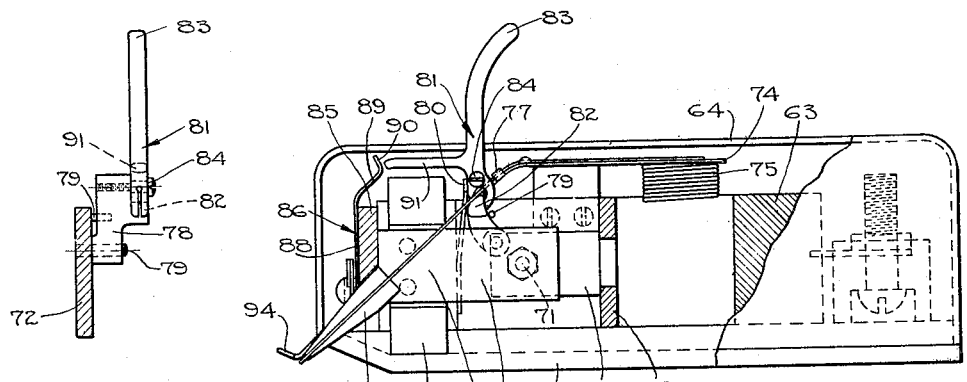
Fig. 9 is a side view, part of the cover being broken away and parts being shown in section.
Fig. 10 is a detail sectional view substantially along the line 10—10 of Fig. 7
Figure 12:
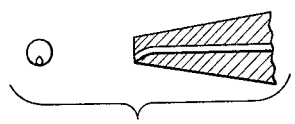
Fig. 12 is a detail showing a slightly modified tip, wherein the passage for the wire is curved to further insure the gripping of the wire.

Mounted on this U shaped frame 72 is a plate 74 which carries at its underside, a coil 75, of hard wire of small gauge. One end of this coil is led up through a perforation 76 in the plate, and forwardly along the upper surface of the plate to be clamped to the plate at its forward end, by means of a finger 77, formed by striking up a portion of the plate. This finger prevents the wire from feeding backward to the coil, and the forward end of the plate is curved downwardly, as clearly shown in Fig. 9, and the wire passing under the finger 77, passes through the center of the coil 66 and through the tapered member 68 to project slightly therebeyond for engagement with the record groove.

Means substantially like that shown in Figs. 5 and 6 is used for feeding the wire through the pick-up to compensate for the wearing away of the wire during the play of a record. This means includes a rockable member 78 disposed on a pin 79 and carried by the frame 72. Movement of this member is limited by means of the pins 79 and spring 80 serves normally to hold the member against one of the stop pins. Pivoted on an arm of this member, is a lever 81, having its lower end engaging over the anvil-like portion 82 and having one of its lower ends bifurcated for the passage of the wire 75, as clearly shown in Fig. 10.

The handle portion 83 of the lever 81 projects upwardly through a slot in the casing or housing 64, and on being moved forwardly about its pivot 84, first operates to grip the wire 75 and on further movement against the action of spring 80, acts to feed the wire through the member 68.

A plate of brass or other non-magnetic material 85, is disposed on the forward face of the pole members 65 and carries a combined guard and gage which functions in the manner of the same part in the figures heretofore described. This gage includes an open member 86, having side arms 87, whose terminals are turned back and disposed in recesses in the face of the plate 85, to form bearings. Further, this member 86 includes an upstanding arm 88 which has its upper portion bent as shown at 89 (Fig. 9) to form a cam surface 90, adapted to be engaged by the forwardly projecting arm 91, of the lever 81, during the initial movement of said lever.

The member 86 is held in place by means of a bronze or other suitable spring 92 fastened to the plate 85 at each side of the member 86, as by means of screws 93, and bearing against the member 86, to hold the same against casual movement.

The lower end of the member 86 is turned outwardly and upwardly to form what may be termed a foot piece 94, this piece being adapted to be moved into the path of the wire 75 to limit its movement through the member 68. On pressing the hand piece 83 forwardly, the wire is initially gripped and during this movement, the end of arm 91 passes down the inclined surface 90 of the upstanding part 88, of member 86, and in so doing, flexes said member by pressing its upper portion outwardly, resulting in its lower portion moving inwardly to intersect the path of movement of the stylus. Further movement of lever 83 does not result in any further movement of the guard, since the same has a substantially flat surface, which the end of arm 91 will now engage, and such further movement results in the forward feeding of the wire. The wire is fed forwardly until the same engages the guard or footpiece 94, after which there can be no further forward movement of the wire. Spring 80 returns the feeding mechanisms to normal position, and the inherent resiliency of the member 86, as well as the spring 92, return the parts to their normal position.

The form of the passageway for the stylus illustrated in Fig. 11 is employed in connection with the invention shown in each of the figures of the drawings.

Assuming the sound-box or pick-up to be equipped with ten inches of wire, through proper manipulation of the feeding means, 10,000 or more records may be played before it will be necessary to renew the supply.

It will be apparent that the invention is applicable to any form of reproducer, either an acoustic one or sound-box or to an electric one or pick-up.

Having thus described the invention, what is claimed is:—

1. In combination, a stylus holder, an elongated wire stylus, means to feed the wire stylus longitudinally of and through the holder to have a portion of the stylus project beyond the holder for use, and said means including a lever adapted to be pressed in a direction transversely of the stylus holder and feed the stylus wire longitudinally of the holder.

2. In a stylus feeding means, a lever member, and means associated therewith adapted on the lever member being depressed to first grip the stylus, and on further depression of the lever, to move forward with the stylus.

3. In a stylus feeding means for an elongated wire stylus, a pivoted lever member adapted to be rocked about its pivot to first grip a wire stylus and on further rocking movement to move the stylus forwardly.

4. In combination with a stylus bar having an opening therethrough to receive an elongated wire stylus, means for gripping a wire stylus and moving the same forwardly to project one of its ends beyond the end of said stylus bar, and other means inoperative during the forward feeding of the wire and adapted to grip the wire and prevent backward feed thereof.

5. The combination as in claim 4 said other means including a pair of spring fingers positioned to engage opposite sides of a wire extending through the stylus bar.

6. In a stylus feeding means, a stylus holder having an opening therethrough to receive an elongated wire stylus, a movable lever member adapted on being pressed in one direction to operate to grip and feed a wire stylus through said holder and in a different direction from the direction of movement of the lever member, means adapted to engage and hold the wire stylus in its new position when the same has been fed through the stylus bar, and means to return the stylus feeding lever to its normal position upon the release of pressure therefrom.

7. In combination, a stylus bar movable about an axis, a tube within the bar and extending through the axis thereof and said stylus bar having an opening communicating with the passage in the tube and forming therewith a stylus receiving opening.

8. In combination, a stylus bar movable about an axis, a tube within the bar and extending through the axis thereof, said stylus bar having an opening communicating with the passage in the tube and forming therewith a stylus receiving opening, means to feed a stylus through said stylus receiving opening to have the same project beyond the end of the stylus bar, and means adapted to engage a stylus when thus projected to hold it in its projected position.

9. In combination, a stylus bar movable about an axis intermediate the ends of the bar, said stylus bar having an opening therethrough extending through its axis and forming a receptacle for a stylus, and means mounted on said stylus bar at its axis for feeding a stylus through the bar to project one end of the said stylus beyond one end of the bar.

10. In combination with a stylus bar, a length of stylus wire, means to feed the wire with respect to the stylus bar and means brought into operation as an incident to the movement of the stylus wire feeding means to limit the extent of the feeding movement of the wire.

11. In combination with a stylus bar, a length of stylus wire, means to feed the wire to have the same extend beyond the stylus bar, and means moved into position by operation of said feeding means to limit the extent of feed of said wire.

12. In combination, a stylus bar, a length of stylus wire, means to feed the stylus wire to have the same project beyond the stylus bar, means moved into position by operation of said stylus wire feeding means to limit the extent to which the wire may be projected beyond the stylus bar, and means for returning the feeding and limiting means to normal position upon release of said feeding means.

13. In combination, a stylus holder, means associated with said holder to feed a length of wire therethrough to have the same project beyond one end of the holder, means for limiting the extent of feed of the wire through the holder by said means, and means positioned above the end of the holder to prevent wear thereof by contact with the surface of a record when the wire is not projecting beyond the end of the holder.

14. In combination, a stylus holder, means associated with the holder to feed a length of wire therethrough to have the same project beyond one end of the holder, means for limiting the extend of feed of the wire through the holder by said means, and means comprising a part of said limiting means positioned above the end of the holder to prevent wear thereof by contact with the surface of a record when the wire is not projecting beyond the end of the holder.

15. In combination, a stylus holder, means to feed a length of stylus wire through the holder to have the wire project beyond the end of the holder, means positioned by operation of said feeding means to limit the extent of feed of said wire, and said limiting means in its normal position acting to prevent wear of the holder upon the stylus being worn away.

16. In combination with a stylus bar, means for gripping an elongated wire stylus and moving the same forwardly to project one of its ends beyond the end of the stylus bar, and means moved into position by the stylus gripping and moving means to limit the extent to which the stylus may be moved by said means.

Signed at Bridgeport, in the county of Fairfield and State of Connecticut, this 16th day of March, A. D. 1928.

FRANK L. CAPPS.